United States Patent [19]

Cronin

[11] Patent Number: 4,667,784
[45] Date of Patent: May 26, 1987

[54] INTEGRATED DUAL BRAKE MECHANISM
[75] Inventor: Michael G. Cronin, Peoria, Ill.
[73] Assignee: Caterpillar Inc., Peoria, Ill.
[21] Appl. No.: 853,249
[22] Filed: Apr. 17, 1986
[51] Int. Cl.$^4$ .................... F16D 55/24; B60K 41/26; B62D 11/16
[52] U.S. Cl. .................... 192/4 A; 74/675; 74/681; 74/710.5; 74/714; 180/6.44; 188/170; 188/72.5
[58] Field of Search ............... 192/4 A, 3 R; 180/6.2, 180/6.44; 74/665 M, 665 N, 675, 681, 665 L, 714, 720.5, 710.5; 188/72.3, 72.5, 170

[56] References Cited

U.S. PATENT DOCUMENTS

| | | | |
|---|---|---|---|
| 2,242,396 | 5/1941 | Johansen | 192/18 A |
| 2,838,150 | 6/1958 | Eason | 192/18 A |
| 3,530,741 | 9/1970 | Charest | 74/675 |
| 3,791,492 | 2/1974 | Neilsen | 188/170 |
| 3,814,222 | 6/1974 | Koivunen | 192/4 A |
| 3,893,549 | 7/1975 | Bennett | 188/170 |
| 3,927,737 | 12/1975 | Prillinger et al. | 188/106 F |
| 3,951,239 | 4/1976 | Newstead | 188/71.5 |
| 4,020,932 | 5/1977 | Windish | 192/4 A |
| 4,024,936 | 5/1977 | Crabb | 192/4 A |
| 4,057,297 | 11/1977 | Beck et al. | 303/71 |
| 4,434,680 | 3/1984 | Riediger et al. | 74/682 |
| 4,540,073 | 9/1985 | Rogier | 192/4 A |
| 4,557,157 | 12/1985 | Oestmann | 74/675 X |

Primary Examiner—Rodney H. Bonck
Assistant Examiner—Richard M. Lorence
Attorney, Agent, or Firm—Charles E. Lanchantin, Jr.

[57] ABSTRACT

A dual brake mechanism for a vehicle having a first disc brake assembly associated with a first output drive member and a second disc brake assembly associated with an opposite second output drive member includes a primary brake actuator for generating a force engaging the first disc brake assembly and a plurality of push elements for mechanically transmitting that force as a reaction laterally to the second disc brake assembly and simultaneously engaging both. The primary brake actuator features a single actuation chamber for providing the engagement force when pressurized. This avoids the full duplication of componentry at the opposite sides of the vehicle. The dual brake mechanism can be compactly integrated with a steering differential and a secondary parking brake actuator.

22 Claims, 5 Drawing Figures

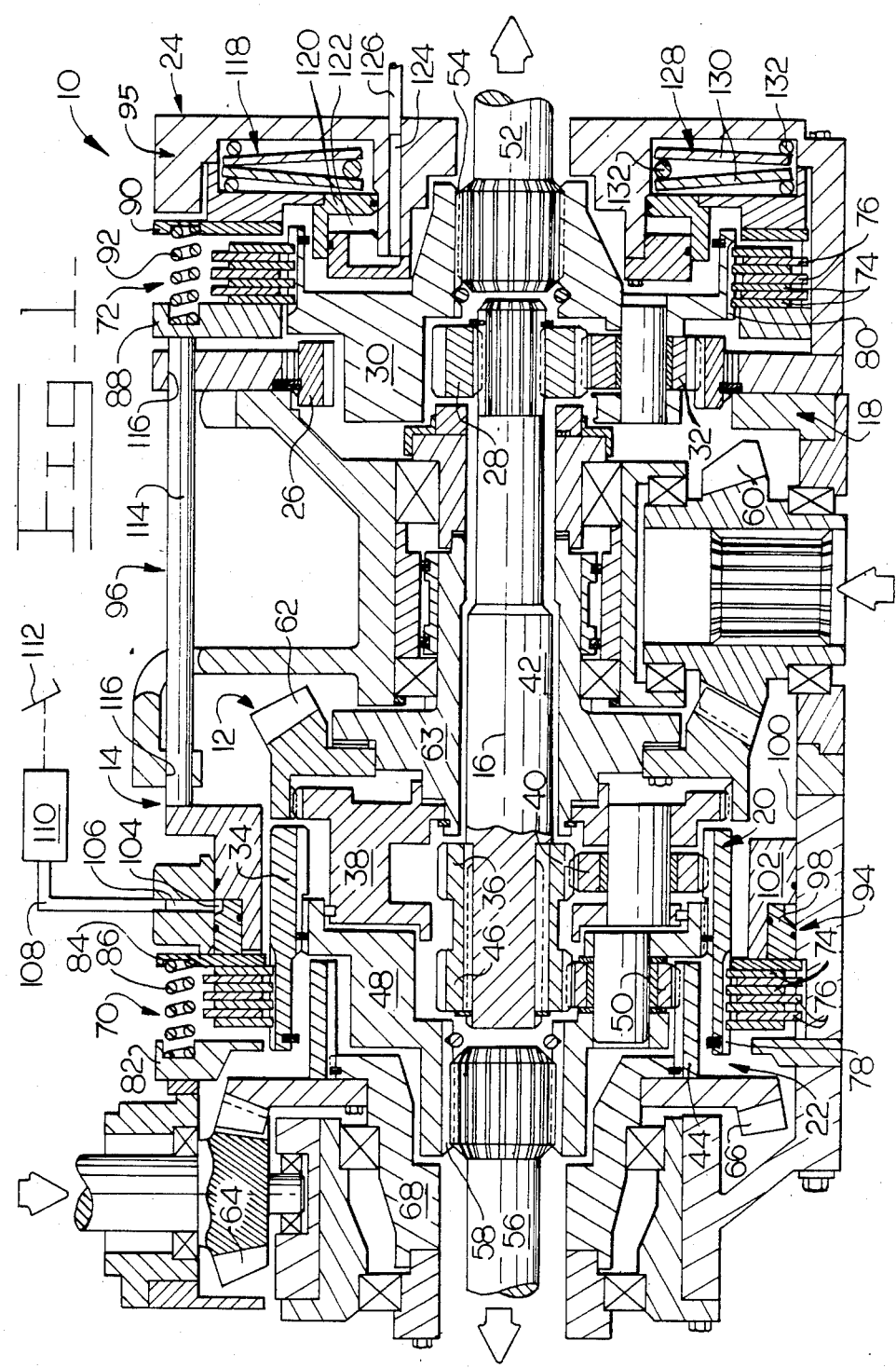

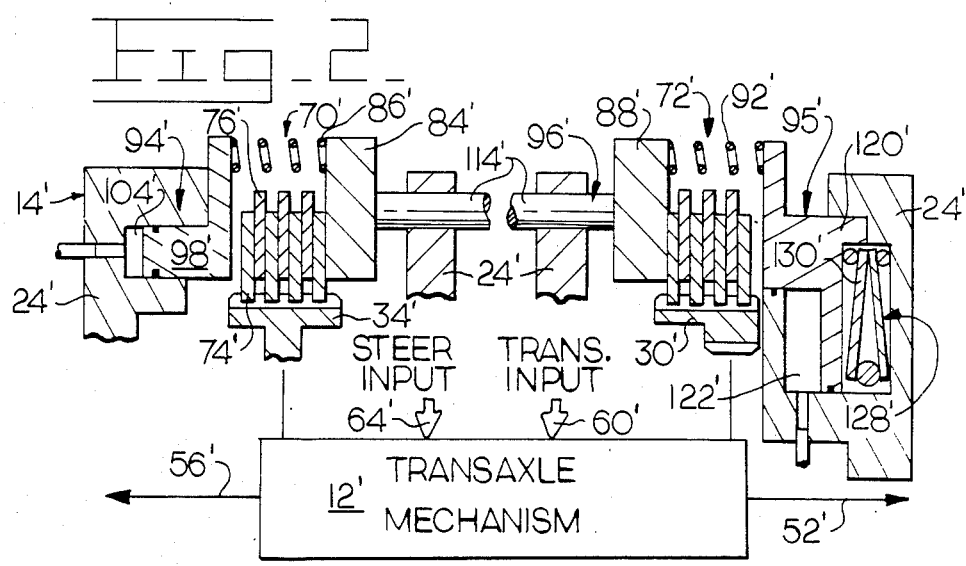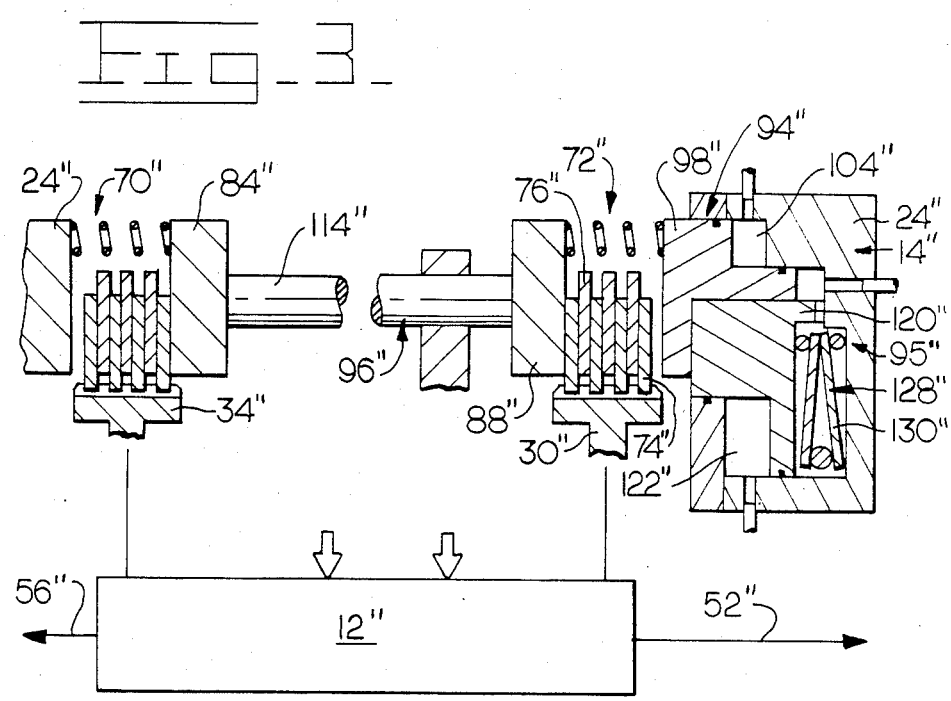

INTEGRATED DUAL BRAKE MECHANISM

DESCRIPTION

1. Technical Field

This invention relates to a mechanism for applying the brakes of a vehicle, and more specifically to a mechanism for simultaneously applying and releasing a pair of transversely separated disc brake assemblies.

2. Background Art

A planetary steering differential which has been particularly effective for continuously driving the laterally opposite output members of a track-type tractor at equal speeds for straight-ahead operation, or at different speeds for steering operation is disclosed in U.S. Pat. No. 4,434,680 issued Mar. 6, 1984, to C. W. Riediger, et al. Duplicate disc brake assemblies are used therewith for simultaneously equally retarding or braking the opposite output members. Not only do the individual disc brake assemblies take up considerable space, but also they are spaced relatively widely apart so that they are not integrated fully with the planetary steering differential. For example, the disc brake assemblies are located laterally beyond the planetary steering differential so that they are not removable therewith, and at such locations the disc brake assemblies make the differential too wide and contribute to a number of serviceability disadvantages.

Accordingly, what is needed is an economical, reliable and simple brake mechanism employing a pair of disc brake assemblies for providing an equal amount of simultaneous braking of the output members, while exhibiting greater flexibility in cross sectional configuration so as to conserve space where needed. By avoiding duplicate or mirror image disc brake assemblies, for example, the brake mechanism can be more compactly integrated with a steering differential, or with any equivalent transaxle drive mechanism. Preferably, the dual brake mechanism thus provided should have positive parking brake capability along with normal service braking, and be more closely spaced laterally so as to allow the removal thereof with the associated differential or transaxle mechanism.

The present invention is directed to overcoming one or more of the problems as set forth above.

DISCLOSURE OF THE INVENTION

In accordance with one aspect of the invention, an integrated dual brake mechanism is provided for a drive mechanism having a frame and first and second oppositely disposed output drive members. A first disc brake assembly is connected to the frame and to the first output drive member, a second disc brake assembly is connected to the frame and to the second output drive member, a brake actuator is provided for generating an engagement force on the first disc brake assembly, and a force transmitting apparatus is provided for transmitting the reaction of such engagement force to the second disc brake assembly and thereby simultaneously engaging both disc brake assemblies.

More specifically, the present invention features the use of a single hydraulically actuated and mechanically released actuator for simultaneously applying a pair of laterally separated disc brake assemblies in the drive mechanism of a vehicle through the mechanical force transmitting action of a plurality of push rods extending generally between them. A single actuation chamber is defined by the actuator which, when pressurized, serves to simultaneously engage the spaced apart disc brake assemblies for normal service braking of the vehicle. Preferably, a single mechanically engaged and hydraulically released auxiliary or parking brake actuator is used therewith that embodies only a single retraction chamber. Various embodiments are illustrated for showing the nonsymmetrical nature of the invention, and the flexibility thereof for allowing placement of certain individual components at the best locations for compact integration with a steering differential or transaxle drive mechanism of a vehicle such as a track-type tractor.

BRIEF DESCRIPTION OF THE DRAWINGS

FIG. 1 is a diagrammatic cross sectional view of the integrated dual brake mechanism of the present invention as taken generally through the central axis of a planetary steering differential and with which the brake mechanism is closely and compactly associated.

FIG. 2 is a diagrammatic, and greatly simplified cross sectional view of a first alternate embodiment of the integrated dual brake mechanism of the present invention.

FIG. 3 is a view similar to FIG. 2 of a second alternate embodiment.

BEST MODE FOR CARRYING OUT THE INVENTION

Figure 4:
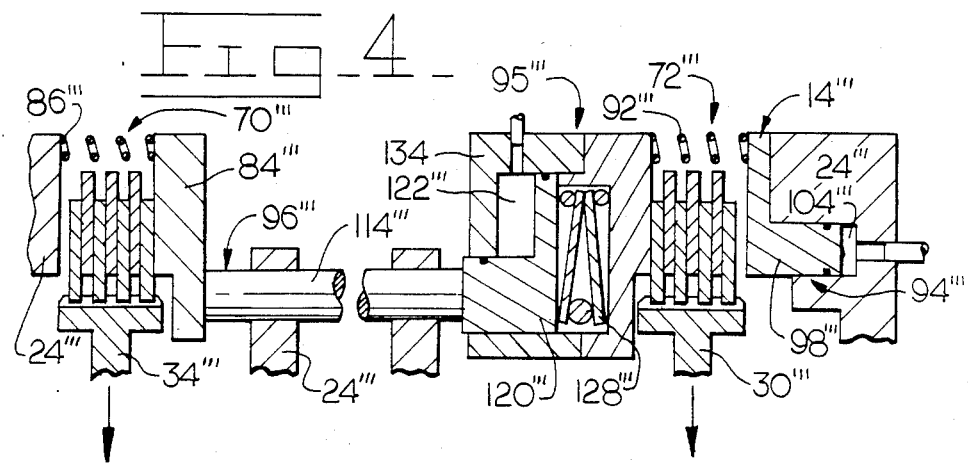
FIG. 4 is a further simplified view of a third alternate embodiment of the present invention.

A portion of a vehicle 10, such as a track-type tractor, is illustrated in FIG. 1 as having a planetary steering differential or transaxle drive mechanism 12 and a dual brake mechanism 14 operatively associated therewith. Both are generally aligned along a central axis 16 oriented transversely or normal to the usual forward and reverse direction of vehicle travel and in a horizontal plane.

The planetary steering differential 12 includes first, second and third interconnected planetary mechanisms 18, 20, and 22 laterally aligned along central axis 16 and rotatably supported within a multi-piece housing assembly or frame 24. The first planetary mechanism 18 includes ring gear, sun gear and planet carrier elements 26, 28, and 30 of the typical type wherein a plurality of similar planet gear elements 32 are rotatably mounted on the carrier element and are in intermeshing toothed engagement with the ring gear and sun gear elements. And, in the instant embodiment, the first planetary mechanism serves as a grounded member train with the ring gear element 26 being releasably and non-rotatably secured to the housing assembly. The second planetary mechanism 20 also includes ring gear, sun gear, and planet carrier elements 34, 36, and 38, and a plurality of planet gear elements 40 mounted on the second carrier element. As is illustrated in FIG. 1, the second sun gear element 36 is directly connected to the first sun gear element 28 by a central shaft 42. Similarly, the third planetary mechanism 22 includes ring gear, sun gear and planet carrier elements 44, 46, and 48, and a plurality of planet gear elements 50 rotatably mounted on the carrier element. It is to be noted that the third planet carrier element 48 is connected for joint rotation with the second ring gear element 34, as is also the third sun gear element 46 with the second sun gear element 36.

The first planet carrier element 30, at the right side when viewing FIG. 1, serves essentially as the second output drive member since it is releasably connected to a right axle shaft 52 by a conventional spline joint 54. On the left side, the third planet carrier element 48 serves as the first output drive member since it is releasably connected to a left axle shaft 56 through a comparable spline joint 58.

A primary input bevel pinion gear 60 transfers power from the usual multi-speed and reversible transmission of the vehicle, not shown, to the planetary steering differential 12. Pinion gear 60 is oriented at a right angle to the central axis 16 and rotatably drives a bevel gear 62 and associated hollow supporting shaft 63 about the central axis 16. Bevel gear 62 is connected for joint rotation with the second planet carrier element 38 so that that element serves as the primary input.

A secondary or auxiliary input bevel pinion gear 64 transfers power in either direction of rotation from an engine-driven pump and motor apparatus, not shown, to the planetary steering differential 12 for steering purposes. It is also oriented at a right angle to the central axis 16, and is adapted to drive a second bevel gear 66 connected for joint rotation with the third ring gear element 44 through an intermediate tubular hub 68. Alternatively, the pinion gear 64 can be held stationary so that both the third ring gear element 44 and the first ring gear element 26 are held stationary, and thus longitudinally straight travel of the tractor is provided.

The dual brake mechanism 14 is adapted to simultaneously brake or to retard the rotation rate of the left and right output drive members 48 and 30, which are connected to the left and right axle shafts 56 and 52 respectively. A first disc brake assembly 70 is located on the left side when viewing FIG. 1 and a second disc brake assembly 72 is located on the right side, and they are individually of a construction for controllably frictionally coupling the respective output drive members 48 and 30 to the housing assembly or frame 24. Each of the disc brake assemblies includes a plurality of conventional annular discs 74 with the usual grooved friction material facing thereon, and a corresponding plurality of conventional annular plates 76 interleaved therewith. The plates are nonrotatably connected to the housing assembly and are axially movable with respect thereto in a conventional manner, while the discs are essentially axially slideable and nonrotatably connected to the output drive members on conventional splines 78 and 80 defined on the external peripheries of the second ring gear element 34 and the first planet carrier element 30, respectively. The discs and plates of the left disc brake assembly 70 are laterally contained between a first stationary end plate 82 and a second axially slideable and nonrotatable end plate 84 which are laterally separable via a plurality of coiled compression springs 86 connected axially between them. The right disc brake assembly 72 likewise has the discs and plates laterally contained between a first and a second end plate 88 and 90 urged apart by a plurality of coiled compression springs 92, but in this instance both of the end plates are axially slideably and nonrotatably connected to the frame for reasons that will later be clear.

The integrated dual brake mechanism 14 advantageously includes a single hydraulically actuated and mechanically released primary brake actuator 94 for generating a service braking force, a single mechanically actuated and hydraulically released secondary brake actuator 95 for alternatively generating a parking or auxiliary braking force, and force transmitting means consisting of a push element apparatus 96 for mechanically transmitting either one of such engagement forces laterally between the first and second disc brake assemblies 70 and 72. In the embodiment of FIG. 1 the primary brake actuator 94 includes a relatively small first annular piston 98 seated within a cylindrical bore 100 of the housing assembly 24, and a relatively larger second and stepped annular piston 102 also seated within the bore and overlapping the inner periphery or bore of the first piston to define a single annular actuation chamber 104 therebetween. A passage 106 in the housing assembly is in communication with the chamber, and a fluid delivery conduit 108 or the like is adapted to be pressurized by a conventional brake control system 110 in proportion to the desired degree of braking such as by operator depression of an associated brake pedal 112.

As can be noted when viewing FIG. 1, the push element apparatus 96 includes a plurality of push elements or elongate cylindrical push rods 114 which are individually laterally slideably free to move in a pair of cylindrical bores 116 defined in the housing assembly 24 and spaced laterally apart for better support. Although only one push rod is illustrated, it can be appreciated that the remaining push rods are generally equally, peripherally spaced in a parallel array to abuttingly extend between the second piston 102 on the left and the inner end plate 88 on the right at about the same radial distance from the central axis 16.

While the primary brake actuator 94 provides the normal service braking engagement force for the vehicle through positive pressurization of fluid to the actuation chamber 104, the inclusion of a secondary brake actuator 95 is also normally desired for mechanically generating an engagement force independently of the primary brake actuator for parking purposes or the like. In the embodiment of FIG. 1, the secondary brake actuator 95 is located laterally outwardly beyond the right disc brake assembly 72 and functions positively in the absence of pressurized fluid. The secondary brake actuator includes an annular auxiliary piston 120 of an appropriately profiled cross section to define with the housing assembly or frame 24 an annular retraction chamber 122. That chamber is in open communication with a serially arranged passage 124 and a fluid delivery conduit 126 which are normally pressurized by a conventional fluid source, not shown, to a preselected pressure, for example 1518 KPa (220 psi). An axially compressible spring set 128 acts upon the piston to oppose fluid pressure in the retraction chamber, and in this embodiment includes a pair of opposed Belleville spring washers 130 cooperatively seated on a plurality of force-transmitting rings 132 of circular cross section.

INDUSTRIAL APPLICABILITY

In operation, when the left and right output planet carrier elements 48 and 30 of the planetary steering differential 12 of FIG. 1 are rotated in the same direction and at the same speed the track-type vehicle 10 will travel in a straight-ahead mode. In such mode of operation the primary input bevel pinion gear 60 is rotatably driven by the usual multi-speed transmission, and the secondary input bevel pinion gear 64 is held stationary by the associated steering motor. While the transmission and steering motor are not illustrated, a more complete description of such components and the full operational relationships between the first, second and third planetary mechanisms 18, 20, and 22 is to be found in previously noted U.S. Pat. No. 4,434,680.

However, in the straight-ahead mode the second planet carrier element 38 is rotatably driven by the pinion gear 60 and the bevel gear 62 in a clockwise direction when viewing along the axis 16 from the right side of FIG. 1. The second ring gear element 34 is thereby forced to rotate in a clockwise direction at a slower rate of speed than the input. Also the interconnected sun gear elements 28, 36, and 46 rotate together in a clockwise direction at a faster rate of speed than the input. Because the first and third ring gear elements 26 and 44 are held stationary as reaction members, the first planet carrier element 30 and the third planet carrier element 48 rotate in a clockwise direction at a rotational rate reduced from that of the input speed.

In order to steer the vehicle 10, the steering motor is actuated to rotate the steering input bevel pinion gear 64 in either direction at a rate determined by the steering angle desired. Assuming a turn to the left is desired while traveling forward, then the pinion gear 64 and second bevel gear 66 are driven sufficient to drive the third ring gear element 44 in a counterclockwise direction. This causes a reaction on the third planet gear elements 50 such that the speed of the third carrier element 48 is reduced. Simultaneously, the speed of the sun gear elements 28, 36, and 46 increases with the result that the first planet carrier element 30 is forced to speed up. Since the speed of the third planet carrier element 48 and left axle shaft 56 is reduced, and the speed of the first planet carrier element 30 and right axle shaft 52 increased, the vehicle makes a steering correction to the left. A steering correction to the right can be made by reversing the direction of rotation of the steering bevel pinion gear 64.

Since steering of the track-type vehicle 10 can be accomplished without use of the first and second disc brake assemblies 70 and 72, it is not necessary that they operate independently. Accordingly, whether the vehicle is going forward or backward in a straight line, or turning during steering, the depression of the pedal 112 by the operator will cause simultaneously controlled application of both disc brake assemblies. Specifically, fluid under pressure proportionate to the desired degree of braking required and up to a maximum of about 1725 KPa (250 psi) is directed to the actuation chamber 104 of the primary brake actuator 94. This urges the overlapping pistons 98 and 102 apart so that piston 98 urges inner end plate 84 to the left to compress the interleaved discs and plates 74 and 76 of the left disc brake assembly 70 against the fixed outer end plate 82. Simultaneously, piston 102 is urged to the right when viewing FIG. 1 so that the plurality of push rods 114 are also urged to the right along with inner end plate 88 of the right disc brake assembly 72. This compresses the discs and plates thereof against the fixed outer end plate 90. Since in normal operation the retraction chamber 122 is pressurized and the auxiliary piston 120 is retracted or moved to the right against the frame 24 as is illustrated, the outer end plate 90 is in abutment with the auxiliary piston and the actuation of the right disc brake assembly is also accomplished. Therefor it can be appreciated that the delivery of pressurized hydraulic fluid to the single primary brake actuator 94 is effective to generate an engagement force laterally upon the first disc brake assembly 70 to retard or stop rotation of the second ring gear element 34 and the left axle shaft 56 conjointly rotatable therewith. The reaction of this force is transferred by the force transmitting push rods 114 laterally upon the second disc brake assembly 72, and this also simultaneously retards or stops rotation of the first planet carrier element 30 and right axle shaft 52.

In the event of the discontinuance of fluid pressure to the chambers 104 and 122, such as would normally take place if the engine of the vehicle were shut off or could take place by a system hydraulic failure, the auxiliary or secondary brake actuator 95 is automatically actuated. Particularly, in the absence of pressure in retraction chamber 122, the frustoconical Belleville spring washers 130 expand loadably against the rings 132 from a position of engagement with the frame 24 to urge the auxiliary piston 120 to the left when viewing the drawing. This moves outer end plate 90 against the discs and plates 74 and 76 of the right disc brake assembly 72 and compressibly against inner end plate 88 and generates and engagement force. This urges the plurality of rods 114 and the piston 102 to the left abuttingly against the smaller piston 98. In turn, the smaller piston abuts the inner end plate 84, resulting in the compression of the discs and plates 74 and 76 of the left disc brake assembly 70 against the outer end plate 82. Thus, simultaneous mechanical braking of the opposite axle shafts 52 and 56 is also provided with the reaction of the engagement force being transferred through the push rods 114.

First Alternate Embodiment

While the construction illustrated in FIG. 1 is very desirable for a planetary steering differential or similar transaxle drive mechanism having an extremely limited amount of space in the region of the left disc brake assembly 70, a first alternate embodiment dual brake mechanism 14' is shown in FIG. 2 which requires more space axially outside of it. This alternate embodiment includes a primary brake actuator 94' having a single spring-retracted, annular piston 98' located at the axially outer side of the left disc brake assembly 70'. The force transmitting means 96' includes a plurality of push rods 114' that extend substantially fully between the opposite disc brake assemblies 70' and 72'. In FIG. 2 elements common to those of FIG. 1 have been shown with similar reference numerals with an added prime indicator for convenient identification.

In operation, pressurization of the actuation chamber 104' will urge piston 98' to the right when viewing FIG. 2 against a plurality of compression springs 86', to urge the interleaved discs and plates 74' and 76' against the inner end plate 84'. Inner end plate 84', the push rods 114' and the opposite end plate 88' are likewise urged to the right so that the discs and plates of the right disc brake assembly 72' are compressed against the retracted auxiliary piston 120'.

The mechanical actuation of the secondary brake actuator 95' is the same as earlier described, except that as the push rods 114' are pushed to the left by the Belleville spring washers 130' acting indirectly upon inner end plate 88', the push rods act directly against the inner end plate 84'.

Second Alternate Embodiment

In the event there is only limited room at the left side of the transaxle drive mechanism 12" for the disc brake assembly 70", then as shown in the second alternate embodiment of FIG. 3, the primary brake actuator 94" including spring-retracted single piston 98" can be relocated at the right side laterally outwardly beyond the discs and plates 74" and 76" and integrated with the secondary brake actuator 95".

Upon pressurization of the actuation chamber 104" in FIG. 3, the piston 98" is urged to the left, and this serves to move the discs and plates of the right disc brake assembly 72" together and against inner end plate 88". Subsequently, the inner end plate 88" and push rods 114" are moved to the left, and the opposite inner end plate 84" is moved to the left against the discs and plates of the left disc brake assembly 70". The secondary brake actuator 95" works as before, only in this embodiment it works through the intermediate piston 98" and against the discs and plates of the right disc brake assembly.

Third Alternate Embodiment

As shown in FIG. 4, a third alternate embodiment dual brake mechanism 14'" has the primary actuator 94'" located on the right side laterally beyond the right disc brake assembly 72'". And the secondary brake actuator 95'" is located between the left and right disc brake assemblies 70'" and 72'" in order to, for example, conserve space laterally outwardly beyond the disc brake assemblies. Instead of a fixed housing assembly 24'", the secondary brake actuator 95'" has a laterally slideably supported auxiliary housing 134 for containing the auxiliary piston 120'" and the spring set 128'".

In this embodiment pressurization of the chamber 104'" urges piston 98'" to the left against the discs and plates of the right disc brake assembly 72'". Thus they are compressed against the floating housing 134 which is in abutting engagement with the retracted auxiliary piston 120'". The auxiliary piston, the push rods 114'", and the inner end plate 84'" are subsequently biased in the same direction to compress the discs and plates of the left disc brake assembly 70'" against the frame 24'".

In the absence of pressure in the chambers 104'" and 122'" the piston 98'" is retracted to the right by the plurality of compression springs 92'" to abut the frame 24'", and the spring set 128'" is expanded. This action moves the auxiliary floating housing 134 to the right to actuate the right disc brake assembly 72'", while the auxiliary piston 120'" is urged to the left along with the push rods 114'" to actuate the left disc brake assembly 70'" through inner end plate 84'".

Fourth Alternate Embodiment

Figure 5:
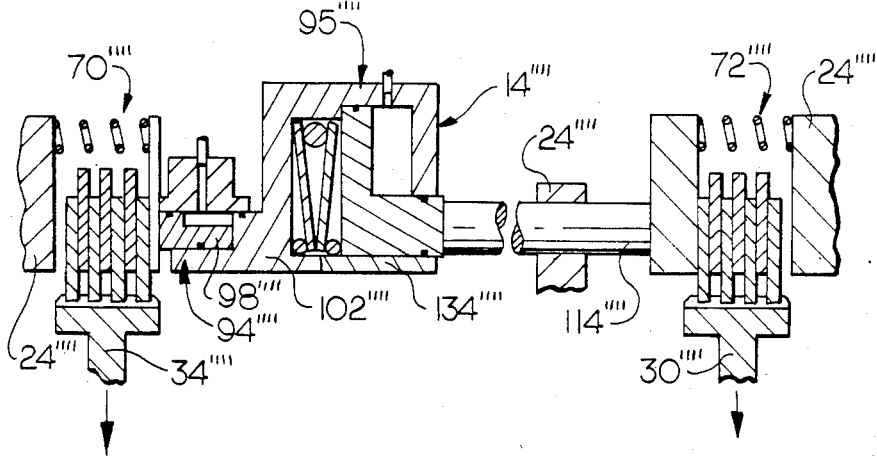
FIG. 5 is a view similar to FIG. 4 of a fourth alternate embodiment.

A still further embodiment is illustrated in FIG. 5 which locates both the primary and secondary brake actuators 94'''' and 95'''' between the discs and plates of the respective disc brake assemblies 70'''' and 72''''. Here, the second piston 102'''' has been coupled directly to the auxiliary floating housing 134'''', but otherwise the dual brake mechanism 14'''' operates in a manner combining the features of the first embodiment and the third alternate embodiment.

It can therefor be appreciated that the dual brake mechanism 14 of the present invention has a single primary service brake actuator 94 and a cooperating force transmitting means 96 including the push elements 114 effective to simultaneously engage the interleaved discs and plates 74 and 76 of the oppositely disposed disc brake assemblies 70 and 72. By the term "single" it is meant that only a single actuator and/or single actuation chamber 104 is required to hydraulically engage both of the disc brake assemblies, rather than the fully duplicated, mirror image systems associated with prior art brake mechanisms. Furthermore, the dual brake mechanism 14 can conveniently incorporate a single secondary parking brake actuator 95. By the latter term "single", it is meant that only one actuator and/or one retraction chamber 122 and associated spring set 128 is required to mechanically engage both disc brake assemblies through cooperation with the force transmitting means 96 in the event of the absence of pressurized control fluid. In marked contrast, duplicate auxiliary pistons, retraction chambers and spring sets have been heretofore used which have required substantial space at each side of the vehicle. Still further, the dual brake mechanism 14 is extremely flexible in its ability to be integrated into almost any steering differential or transaxle drive mechanism and can be removed as a unit therewith in a modular manner.

Other aspects, objects, and advantages of this invention can be obtained from a study of the drawings, the disclosure, and the appended claims.

I claim:

1. An integrated dual brake mechanism for a drive mechanism including a frame, an input member rotatably supported by the frame along a central axis, and first and second output drive members individually rotatably supported by the frame along the central axis at the opposite sides of the input member comprising:
   a first disc brake assembly connected to the frame and to the first output drive member at one side of the input member;
   a second disc brake assembly connected to the frame and to the second output drive member at the other side of the input member;
   brake actuator means for generating an engagement force on the first disc brake assembly;
   force transmitting means for transmitting the reaction of such engagement force to the second disc brake assembly and thereby simultaneously engaging both disc brake assemblies and braking both output drive members, the force transmitting means including a plurality of elongate push rods; and
   the frame defining means for nonrotatably and slidably supporting the push rods for movement in an axial direction in a parallel array extending generally between the disc brake assemblies.

2. The brake mechanism of claim 1 wherein the brake actuator means includes a hydraulically engaged and spring released primary brake actuator, and a spring engaged and hydraulically released secondary brake actuator adapted to selectively engage the disc brake assemblies in the absence of a preselected pressure in the brake mechanism.

3. The brake mechanism of claim 1 wherein the brake actuator means includes a primary piston and an actuation chamber located axially outwardly of disc brake assemblies, the engagement force being generated by the supply of pressurized fluid to the chamber, and further includes an auxiliary piston, a retraction chamber and a spring set effective to bias the auxiliary piston in a direction to engage the second disc brake assembly, the auxiliary piston being located axially outwardly of the disc brake assemblies.

4. The brake mechanism of claim 1 wherein the brake acutator means includes a primary piston, a single actuation chamber associated with the primary piston with the engagement force being generated by pressurizing the actuation chamber, an auxiliary piston, a single retraction chamber associated with the auxiliary piston, and a spring set for generating a mechanical force to engage both disc bake assemblies in the absence of pressurized fluid to the retraction chamber through the push rods.

5. The brake mechanism of claim 4 wherein the pistons and the chambers are juxtaposed and located axially outwardly of one of the disc brake assemblies.

6. The brake mechanism of claim 4 wherein the auxiliary piston, retraction chamber and spring set are located axially between the disc brake assemblies.

7. The brake mechanism of claim 1 wherein each of the disc brake assemblies is aligned along the central axis and includes a nonrotatable end plate, the push rods abutting one of the end plates and extending axially toward the other one of the end plates.

8. An integrated dual brake mechanism for a drive mechanism including a frame and first and second oppositely disposed output drive members rotatably supported by the frame, comprising:
   a first disc brake assembly connected to the frame and to the first output drive member;
   a second disc brake assembly connected to the frame and to the second output drive member;
   brake actuator means for generating an engagement force on the first disc brake assembly and including first and second pistons and a single actuation chamber associated therewith located between the disc brake assemblies, the engagement force being generated and the pistons being separable in response to pressurizing the single actuation chamber; and
   force transmitting means for transmitting the reaction of such engagement force to the second disc brake assembly and thereby simultaneously engaging both disc brake assemblies and braking both output drive members, the force transmitting means including a plurality of push elements located generally between the disc brake assemblies and disposed in force transmitting relation with the second piston.

9. An integrated dual brake mechanism for a drive mechanism including a frame and first and second oppositely disposed output drive members rotatably supported by the frame along a central axis, comprising:
   a first disc brake assembly connected to the frame and to the first output drive member;
   a second disc brake assembly connected to the frame and to the second output drive member;
   brake actuator means for generating an engagement force on the first disc brake assembly, the brake actuator means including an acutation chamber and a pair of juxtaposed pistons axially separable with pressurization of the actuation chamber; and
   force transmitting means for transmitting the reaction of such engagement force to the second disc brake assembly and thereby simultaneously engaging both disc brake assemblies and braking both output drive members, the force transmitting means including a plurality of elongate push rods slidably supported by the frame and peripherally spaced in a parallel array.

10. The brake mechanism of claim 9 wherein the disc brake assemblies include a plurality of compression springs for urging the pistons retractably together.

11. An integrated dual brake mechanism for a vehicle including a frame and a drive mechanism having an input member rotatably supported by the frame along a central axis, and first and second output drive members individually rotatably supported by the frame along the central axis at the opposite sides of the input member, comprising:
   a first disc brake assembly connected to the frame and to the first output drive member at one side of the input member;
   a second disc brake assembly connected to the frame and to the second output drive member at the other side of the input member;
   first actuator means defining a single pressurizable actuation chamber for simultaneously engaging both disc brake assemblies and braking both output drive members in response to pressurization of the actuation chamber, the first actuator means including a plurality of elongate push rods individually nonrotatably and slidably connected to the frame for movement in an axial direction and extending generally between the disc brake assemblies in a parallel array; and
   second actuator means defining a single pressurizable retraction chamber and mechanical means for simultaneously engaging both disc brake assemblies and braking both output drive members through the push rods of the first actuator means in response to depressurization of the retraction chamber.

12. The brake mechanism of claim 11 wherein the second actuator means includes a piston operatively associated with the retraction chamber and the mechanical means includes a plurality of compression springs for extending the piston in a direction to mechanically engage the disc brake assemblies and acting through the push rods.

13. An integrated dual brake mechanism for a vehicle including a frame and a drive mechanism having an input member rotatably supported by the frame along a central axis, and first and second output drive members individually rotatably supported by the frame along the central axis, comprising:
   a first disc brake assembly connected to the frame and to the first output drive member at one side of the input member;
   a second disc brake assembly connected to the frame and to the second output drive member at the other side of the input member;
   single service brake actuator means for simultaneously hydraulically engaging both disc brake assemblies and braking both output drive members and including a plurality of elongate push rods nonrotatably and slidably supported by the frame in a parallel array and extending generally axially between the disc brake assemblies; and
   single parking brake actuator means for simultaneously mechanically engaging both disc brake assemblies and braking both output drive members by working through the push rods.

14. The brake mechanism of claim 13 wherein the parking brake actuator means includes a piston defining with the frame a retraction chamber, and spring means for urging the piston in a direction for engaging both disc brake assemblies through the push rods in the absence of fluid pressure in the retraction chamber.

15. The brake mechanism of claim 14 wherein the service brake actuator means includes another piston defining with the frame an actuation chamber, and spring means for retracting the another piston in the absence of fluid pressure in the actuation chamber.

16. An integrated dual brake mechanism for a vehicle including a frame and a drive mechanism having first and second oppositely disposed output drive members supported by the frame along a common central axis, comprising:

a first disc brake assembly connected to the frame and to the first output drive member;

a second disc brake assembly connected to the frame and to the second output drive member;

single service brake actuator means for simultaneously hydraulically engaging both disc brake assemblies and braking both output drive members and including a plurality of push elements extending generally axially between the disc brake assemblies and a pair of laterally separable pistons defining with the frame an actuation chamber, one of the pistons being operatively connected to the push elements; and single parking brake actuator means for simultaneously mechanically engaging both disc brake assemblies and braking both output drive members by working through the push elements.

17. An integrated dual brake mechanism for a vehicle including a frame and a drive mechanism having first and second laterally oppositely disposed output drive members supported by the frame, comprising:

a first disc brake assembly connected between the frame and the first output drive member and including a first movable end plate;

a second disc brake assembly connected between the frame and the second output drive member and including a second movable end plate; and actuating means for simultaneously urging both end plates laterally apart, engaging both disc brake assemblies and braking both output members, said actuating means including a pair of juxtaposed and laterally separable pistons and a plurality of push elements for laterally transferring reaction forces from one of the pistons to one of the disc brake assemblies.

18. The brake mechanism of claim 17 wherein the pistons and the frame define a single fluid pressure actuation chamber therebetween.

19. The brake mechanism of claim 18 wherein the actuating means includes auxiliary brake actuator means for mechanically engaging the second disc brake assembly and urging the push elements and the pistons in a direction to engage the first disc brake assembly.

20. The brake mechanism of claim 19 wherein the auxiliary brake actuator means includes a plurality of compression springs and an auxiliary piston defining with the frame a fluid pressure retraction chamber, the auxiliary brake actuator means being deactivated in response to pressure in the retraction chamber and compression of the springs by the auxiliary piston.

21. The brake mechanism of claim 18 wherein each of the disc brake assemblies includes spring means for retractably urging the pistons together in the absence of a preselected pressure to the actuation chamber.

22. The brake mechanism of claim 21 actuating means includes parking brakes means for mechanically urging the second disc brake assembly against the second end plate and engaging the second disc brake assembly, and through the push elements and the pistons urging the first end plate in a direction to engage the first disc brake assembly in the absence of pressure in the brake mechanism.

* * * * *